United States Patent
Kitagawa et al.

(10) Patent No.: US 7,042,168 B2
(45) Date of Patent: May 9, 2006

(54) FLUORESCENT-LAMP DRIVING APPARATUS ADOPTING HIGH-FREQUENCY INVERTER DRIVING METHOD, AND COMPACT SELF-BALLASTED FLUORESCENT LAMP EQUIPPED WITH SUCH FLUORESCENT-LAMP DRIVING APPARATUS

(75) Inventors: Hiroki Kitagawa, Kouga-gun (JP); Hiroki Nakagawa, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 21 days.

(21) Appl. No.: 10/802,094

(22) Filed: Mar. 16, 2004

(65) Prior Publication Data
US 2004/0245939 A1 Dec. 9, 2004

(30) Foreign Application Priority Data
Mar. 31, 2003 (JP) .............................. 2003-096397

(51) Int. Cl.
*H05B 41/16* (2006.01)
(52) U.S. Cl. .......................... 315/246; 315/58; 315/57; 315/112; 362/260
(58) Field of Classification Search ................ 315/246, 315/58, 245, 248; 313/46, 493; 439/676; H05B 41/16
See application file for complete search history.

(56) References Cited

U.S. PATENT DOCUMENTS

| | | | | |
|---|---|---|---|---|
| 4,647,820 A | * | 3/1987 | Chermin et al. | 315/245 |
| 5,828,170 A | * | 10/1998 | Nishio et al. | 313/493 |
| 6,577,066 B1 | * | 6/2003 | Kominami et al. | 315/58 |
| 6,600,272 B1 | * | 7/2003 | Matsui et al. | 315/246 |
| 2003/0057877 A1 | * | 3/2003 | Kurachi et al. | 315/248 |
| 2004/0005820 A1 | * | 1/2004 | Gutierrez et al. | 439/676 |
| 2005/0023947 A1 | * | 2/2005 | Tsuneto et al. | 313/46 |
| 2005/0068775 A1 | * | 3/2005 | Iida et al. | 362/260 |

FOREIGN PATENT DOCUMENTS

| | | |
|---|---|---|
| JP | 2002-075010 | 3/2002 |
| JP | 2002-075012 | 3/2002 |
| JP | 2003-208802 | 7/2003 |

\* cited by examiner

*Primary Examiner*—Trinh Dinh
*Assistant Examiner*—Binh Van Ho

(57) ABSTRACT

A fluorescent-lamp driving apparatus and a compact self-ballasted fluorescent lamp, when a blowout occurs at the electrodes of the arc tube, swiftly and assuredly stop a glow discharge at the electrodes of the arc tube, therefore have heightened security. In the compact self-ballasted fluorescent lamp 1, a switching device (nMOS-FET56) is mounted to the lighting unit 50 so that the entire device main body of the switching device faces the choke coil 52, with the print substrate 51 therebetween. Thus structured lighting unit 50 forms a heat transmission path between the nMOS-FET56 and the choke coil 52, and the heat generated at the choke coil 52 will be swiftly and assuredly transmitted to the device main body of the nMOS-FET56.

13 Claims, 6 Drawing Sheets

FLUORESCENT-LAMP DRIVING APPARATUS ADOPTING HIGH-FREQUENCY INVERTER DRIVING METHOD, AND COMPACT SELF-BALLASTED FLUORESCENT LAMP EQUIPPED WITH SUCH FLUORESCENT-LAMP DRIVING APPARATUS

BACKGROUND OF THE INVENTION (1) Field of the Invention

The present invention relates to a fluorescent-lamp driving apparatus that performs driving using a high-frequency inverter method, and a compact self-ballasted fluorescent lamp equipped with such fluorescent-lamp driving apparatus.

(2) Related Art

Recently, the energy-saving trend has started to prevail in the field of illumination. Accordingly, compact self-ballasted fluorescent lamps are replacing incandescent lamps having been conventionally used.

A representative compact self-ballasted fluorescent lamp is composed of: an arc tube fixed to a holder; a driving apparatus for driving the arc tube; and a case provided so as to keep the driving apparatus from such as human hands at the time of driving. At one end of the case, a base is fixed for fixing the compact self-ballasted fluorescent lamp to a socket, and for taking in power from the commercial electric source.

At both ends of the discharge path of the arc tube, electrodes made of filament coil are provided, and each lead therefrom is connected to the driving apparatus.

Conventional driving apparatuses are magnetic circuit type such as a glow-start type and a rapid-start type. However recently, those adopting inverter method have started to be used, because of advantages in realizing production of smaller devices, and in reduction of energy loss. A representative driving apparatus adopting inverter method is composed of: a rectifier circuit that includes a diode bridge device and an electrolytic capacitor device; a resonance circuit made of a choke coil, a resonance capacitor device, and the like; and an inverter circuit whose main components are two FET devices.

In such an inverter-type driving apparatus, electrodes in the arc tube will be preheated for a given time period, at the driving start (i.e. when the power is turned on). As the temperature of the electrodes rises, the frequency of the inverter circuit will gradually go down, and the resonance circuit composed of the choke coil and the resonance capacitor device will have increased voltage, at the driving apparatus. The discharge will start in the arc tube when the voltage of the resonance capacitor device becomes higher the starting voltage of the arc tube (e.g. Japanese Patent Publication 2002-75010).

Incidentally, when the arc tube reaches the end of the life, a blowout occurs at a portion of the filament coil, thereby leading to so called "non-emission" state. In the non-emission state of a compact self-ballasted fluorescent lamp, the lamp voltage (Vla) becomes high, and the tube electric current becomes small. Therefore large electric current will run via the preheating capacitor, so as to have the choke coil and the FET devices to generate heat. If this state continues, the temperature of the electrodes and the surrounding area will gradually increase. There sometimes happens that the temperature of the electrodes and the surrounding area reaches to an extent that melts the case made of resin.

Therefore, it is important, in compact self-ballasted fluorescent lamps, to stop the glow discharge to be generated at the electrodes in the non-emission state, swiftly and assuredly.

In view of this, the compact self-ballasted fluorescent lamp having the conventional inverter-type lighting circuit (such as the Japanese Patent Publication 2002-75010) adopts the following method. That is, when such a non-emission state results, the increase in electric current running in the circuit breaks the FET device, so as to stop the switching device function of the FET devices, and further to stop the glow discharge from the electrodes. To be more specific, if the compact self-ballasted fluorescent lamp results in a non-emission state, a blowout of the electrodes will raise the lamp's lighting maintain voltage. In response to this, the voltage applied to the resonance capacitor device will increase. This leads to increase in electric current to be supplied to the electrodes (i.e. increase in electric current running in the FET devices of the driving apparatus), so as to have the FET devices to generate heat. The FET devices will break when this electric current exceeds the upper limit for the FET device. This is how the FET devices cease to function as a switching device.

Incidentally, recent trend with the compact self-ballasted fluorescent lamps is to use a spiral arc tube, instead of conventional U-shape arc tubes, because spiral arc tubes have excellent luminous efficiency. However, if such a compact self-ballasted fluorescent lamp equipped with a spiral arc tube has a conventional driving apparatus, glow discharge at the electrodes cannot be stopped swiftly and assuredly, in a non-emission state. This is because, with a compact self-ballasted fluorescent lamp with a spiral arc tube, only small electric current runs to the FET device, compared to a counterpart with a U-shape arc tube and the like. This means that, in the compact self-ballasted fluorescent lamp with a spiral arc tube, the FET device will not be broken over a long period of time after the non-emission state begins.

In view of the above, in the compact self-ballasted fluorescent lamp, particularly in the compact self-ballasted fluorescent lamp equipped with a spiral arc tube, it is desired to stop glow discharge to be generated at the electrodes of the arc tube in the non-emission state, more swiftly and assuredly than conventionally.

SUMMARY OF THE INVENTION

In view of the aforementioned problem, the object of the present invention is to provide a fluorescent-lamp driving apparatus and a compact self-ballasted fluorescent lamp that have heightened security, in which, when a blowout happens at electrodes in the arc tube, glow discharge at the electrodes can be stopped swiftly and assuredly.

So as to achieve the above object, the driving apparatus of the present invention has: a substrate that has a first main surface and a second main surface, each main surface including an electronic-device mountable area; a choke coil that is mounted to the first main surface and is thermally connected to the substrate, the choke coil being a component of a high-frequency inverter; and a switching device that is mounted to the second main surface, so as to be opposed to the choke coil with the substrate therebetween and to be thermally connected to the substrate, the switching device being a component of the high-frequency inverter and being positioned in a power-supply path to the fluorescent lamp.

In the conventional driving apparatus, a switching device is placed at a distant place from the choke coil. On the contrary, in one example of the driving apparatus of the present invention, the switching device is placed so that the entire main body thereof faces the choke coil, with a substrate therebetween (i.e. just in the rear side of the choke coil), thereby forming a heat transmission path between the switching device and the choke coil. This arrangement enables the heat to be transmitted swiftly and assuredly from the choke coil to the main body of the switching device. Therefore, if a blowout happens at a portion of the electrodes of the arc tube connected to the driving apparatus (i.e. non-emission state), the heat generated at the choke coil will be swiftly transmitted to the switching device, so as to stop the device function when the temperature of the switching device (i.e. of the device's main body) exceeds the upper limit of the heat-resistance thereof.

Therefore, the driving apparatus relating to the present invention has security advantage, because glow discharge at the electrodes of the arc tube will be swiftly and assuredly stopped in case of such as non-emission state generated at the arc tube connected to the driving apparatus.

Note that generally speaking, among the components of the aforementioned apparatus, the choke coil has a structure in which a coil is provided on a resin coil-base having a rectangular cross section. As already mentioned, the main body of the switching device is provided to face the choke coil, with a substrate therebetween, in the driving apparatus. This specifically means that when the switching device and the choke coil are viewed in the vertical direction from above the main surface of the substrate at which the choke coil is provided, to also see the rear side of the substrate in perspective, the position of the switching device is such that the whole of the main body of the switching device is covered by the choke coil. However, "the whole" here does not always mean "100% of the mainbody," and means "the substantially whole of the main body".

Another advantage of providing the choke coil and the switching device in the above-described positioning is that space efficiency is enhanced for the driving apparatus, which helps improve the device adaptability of the entire lamp.

The above driving apparatus is desirable because it can accurately stop its switching function when the temperature of the switching device's main body exceeds the upper limit of its heat resistance, by receiving heat transmitted from the choke coil. If the switching device is a transistor device such as a FET device, it is particularly desirable because the switching function is assuredly stopped at an accurate temperature.

It should be noted here that the device to be provided to be opposed to the choke coil with the substrate therebetween may alternatively be a PTC device, and should not be limited to the switching device such as a transistor device, as long as it can accurately stop its function in response to heat transmitted from the choke coil.

In addition, an ordinary driving apparatus equipped with an inverter circuit includes a smoothing capacitor device composing the rectifier circuit. With the driving apparatus of the present invention, it is preferable that the smoothing capacitor device main body, of this smoothing capacitor device, be provided in the proximity of the choke coil, either in contact with the choke coil, or with a gap of 4 mm or smaller with the choke coil. By this arrangement of the smoothing capacitor device, in case that the switching device does not break when the choke coil generates heat in the non-emission state, this smoothing capacitor device provided in the proximity of the choke coil (either in contact with, or with a gap of 4 mm or smaller with) will be broken in the aforementioned driving apparatus. If a driving apparatus has a broken smoothing capacitor device, the power supply to the switching device will be unstable, so as to break the switching device, thereby eventually leading to the stop of the circuit.

Furthermore, in the driving apparatus, it becomes possible to assuredly transmit the heat from the choke coil to the smoothing capacitor device, if the smoothing capacitor device lead portion, elongated from the smoothing capacitor device main body of the smoothing capacitor device, is processed to be bent to conform to the outer surface of the choke coil, and if an arrangement is made so that the heat generated at the choke coil is transmitted to the smoothing capacitor device main body via the smoothing capacitor device lead portion.

In addition, with the driving apparatus, on the main surface of the substrate on which the choke coil is provided, a plurality of other electronic devices are mounted by insertion mounting method. It is preferable that at least one of such electronic devices be provided to have an angle in a range larger than 0 degree and smaller than 90 degrees with respect to a mounting orientation of the choke coil, and that the lead portion of the electronic device having the angle be processed to be bent. If at least one of the electronic devices is arranged as such, and the lead portion thereof is processed to be bent, the driving apparatus will have smaller effective volume, so that the entire apparatus has improved space efficiency. In other words, the above arrangements will help reducing the size of a compact self-ballasted fluorescent lamp.

It should be noted that the mounting orientation of the choke coil, meant above, is a direction parallel to either longitudinal side or latitudinal side of the rectangular base portion of the choke coil.

The above structure of driving apparatus is particularly effective in supplying power for driving the arc tube whose discharge path has a double-spiral configuration.

In addition, the compact self-ballasted fluorescent lamp of the present invention is characterized by including therein the described driving apparatus.

In this compact self-ballasted fluorescent lamp, if there is a blowout at electrodes of the arc tube, because of life ending due to long lighting hour and so on (i.e. non-emission state), the heat generated at the choke coil can be swiftly and assuredly transmitted to the switching device. Therefore, the switching function is stopped not only by increase in electric current running in the driving apparatus, but also by heat from the choke coil, which even more ensures the stopping of the glow discharge at the electrodes, swiftly and assuredly.

Accordingly, heightened security is ensured for the compact self-ballasted fluorescent lamp, since an extraordinary heat generation is restrained at the electrodes and the surrounding area.

In an ordinary compact self-ballasted fluorescent lamp, it is usual that the portion corresponding to the driving apparatus is covered with a case made of resin, so as to keep human hands from the driving apparatus and so on at the time of driving. Compared to this, the compact self-ballasted fluorescent lamp of the present invention stated above has improved security, because extraordinary heat is not generated at the area surrounding the electrodes, even when a blowout occurs at the electrodes, as stated above.

In particular, when a compact self-ballasted fluorescent lamp equipped with an arc tube whose discharge path is formed spirally (double-spiral configuration) is disposed, both ends of the discharge path, at which the electrodes are formed, are sometimes stored in the case. With the present invention, the heat generated at the choke coil will be transmitted to the switching device, thereby stopping swiftly and assuredly the glow discharge in the arc tube at the time of electrode breakage. Therefore, the case provided adjacent to the electrodes will not be subjected to a high temperature.

More specifically, when a compact self-ballasted fluorescent lamp has an arc tube whose discharge path has a double-spiral configuration, it is usual that electric current running in the lighting circuit will not increase much at the electrode blowout (i.e. in the non-emission state). However, by including the driving apparatus having the aforementioned structure, even a compact self-ballasted fluorescent lamp having such an arc tube can swiftly and assuredly stop the switching function of the switching device, thereby preventing the glow discharge at the arc-tube electrodes to last for a long period of time.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED
EMBODIMENTS

The following describes a compact self-ballasted fluorescent lamp 1 relating to an embodiment of the present invention (hereinafter simply "lamp 1"), with reference to the drawings.

(Entire Structure of Lamp 1)

Figure 1:
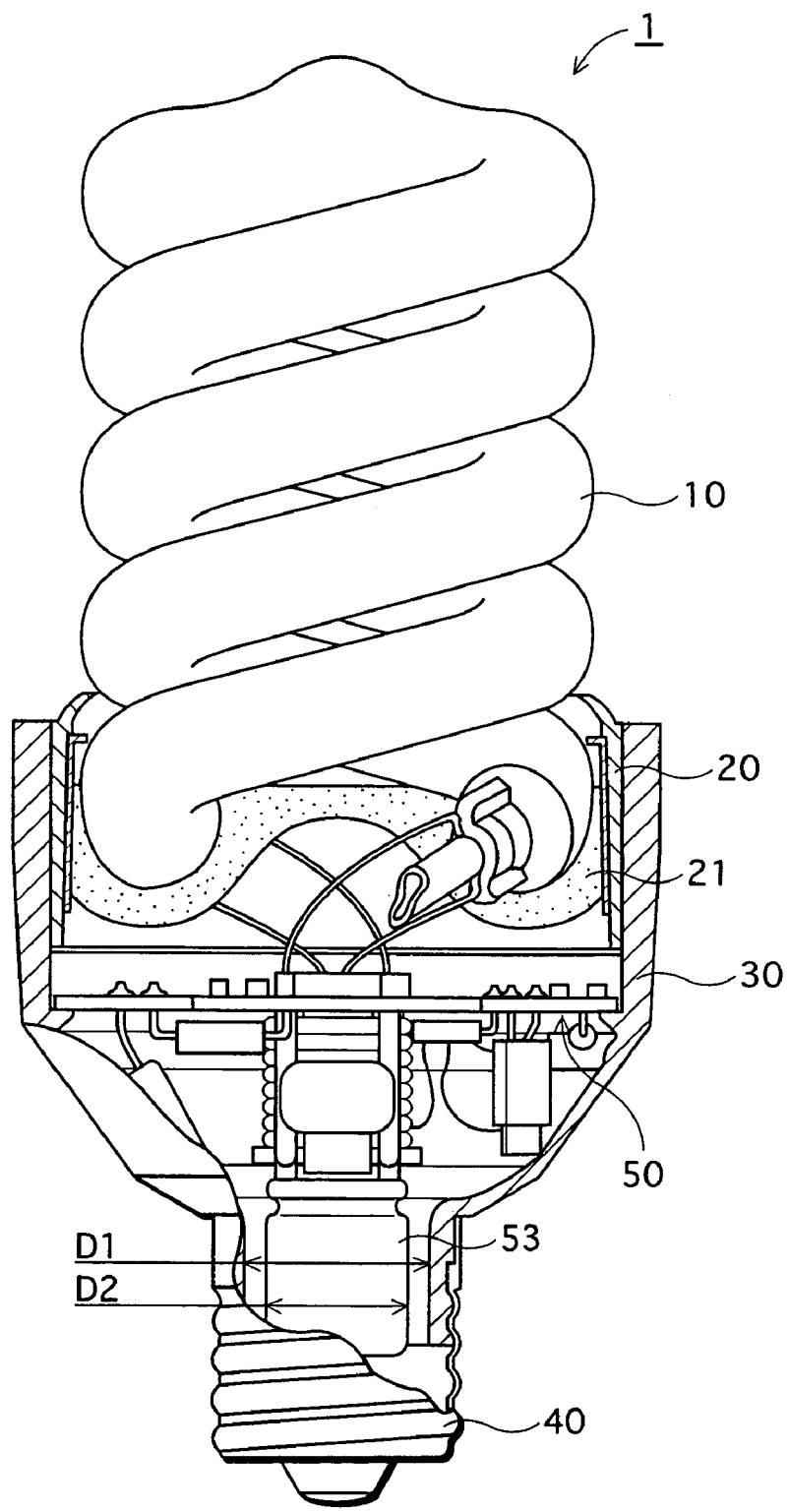
FIG. 1 is a sectional view of the structure of a compact self-ballasted fluorescent lamp 1 that relates to the embodiment of the present invention.

FIG. 1 is a sectional view of the lamp 1 seen from a side. The lamp 1 shown in this drawing is of 12W-type, which can be substituted as an incandescent lamp of 60W-type.

As shown in FIG. 1, the lamp 1 is made up of: an arc tube 10 whose discharge path is formed in a double spiral configuration; a holder 20 for holding the arc tube 10; a lighting unit 50 for driving the arc tube 10; and a resin case 30 whose one end is fixed to the base 40, and is for covering the holder 20 and the lighting unit 50.

The arc tube 10 has a structure in which a glass tube made of soft glass (having outer diameter φ of 9.0 mm, for example) is turned at a substantial middle thereof to form a turning portion, and is wound around the axis of spiral that passes through the turning portion, the both ends of the glass tube being sealed. At the both ends of the inner space of the arc tube 10 (i.e. the inner surface being discharge path), electrodes made of filament coil are provided. The electrodes are not shown in the drawings. The length of discharge path is set to be 400 mm, for example. The inner surface of the arc tube 10 is provided with a phosphor layer. In the inner space of the arc tube 10, mercury, and a mixture gas of Ar and Ne are filled.

The holder 20 is made of a resin material such as PET (polyethylene terephthalate), and has insertion holes that conform to the form of electrode-provided areas of the arc tube 10 where the electrodes are provided. The insertion hole is not provided in the drawings. The arc tube 10 is fixed to the holder 20 by means of the resin layer 21 made of such material as silicone resin, and in a state that the electrode-provided areas are inserted in the insertion holes.

The resin case 30 has a funnel-like form, and is made of PBT (polybutylene terephthalate) for example. At the upper side of the resin case 30 in the drawing, the holder 20 is fixed, and at the lower side thereof in the drawing, the base 40 is fixed.

The base 40 is a metal cylinder, at the outer side surface of which, a thread groove is cut (E17 type).

On main surfaces of the print substrate of the lighting unit 50, wiring has been carried out in a predetermined pattern. A plurality of electronic devices (including an electrolytic capacitor device 53) are provided for this print substrate, so as to form an inverter circuit and so on. Here, the electrolytic capacitor device 53 is a device constituting a rectifier smoothing circuit, and is provided to smooth the power. The electrolytic capacitor device 53 is characterized by having particularly low heat resistance (e.g. operating temperature of 110° C. or below), even compared to the other electronic devices provided for the lighting unit 50. Accordingly, the electrolytic capacitor device 53 is provided so that the main body of the electrolytic capacitor device 53 having outer diameter D2 (e.g. φ 10.0 mm) and in substantially cylindrical form is placed in the inner space formed in the resin case 30 near where the base 40 is fixed, the resin case 30 having the inner diameter D1 of φ 12.0 mm, for example.

The device positions and circuit structures of the lighting unit 50 will be detailed later.

Note that in FIG. 1, wiring carried out between the lighting unit 50 and the base 40 is not shown, to facilitate explanation. However in reality, lead wires are provided to provide electric connection therebetween.

(Structure of Lighting Unit 50)

Figure 2A:
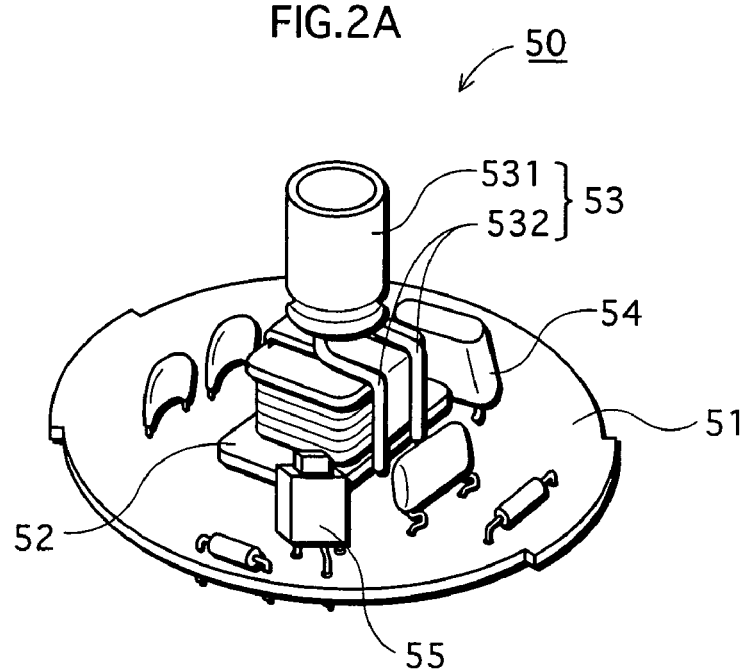
FIG. 2A is a perspective view of the lighting unit 50, seen from above and in a slanting direction.
Figure 2B:
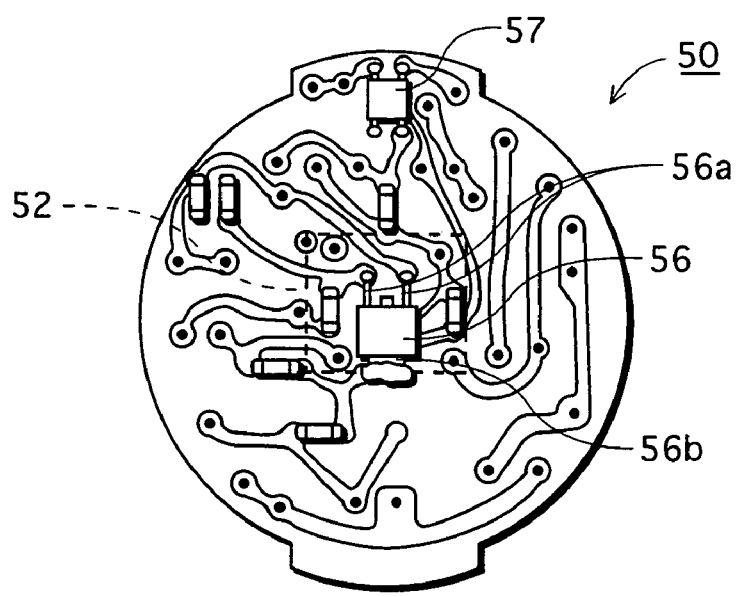
FIG. 2B is a plan view of the lighting unit 50, seen from the rear surface of the print substrate 51.
Figure 3:
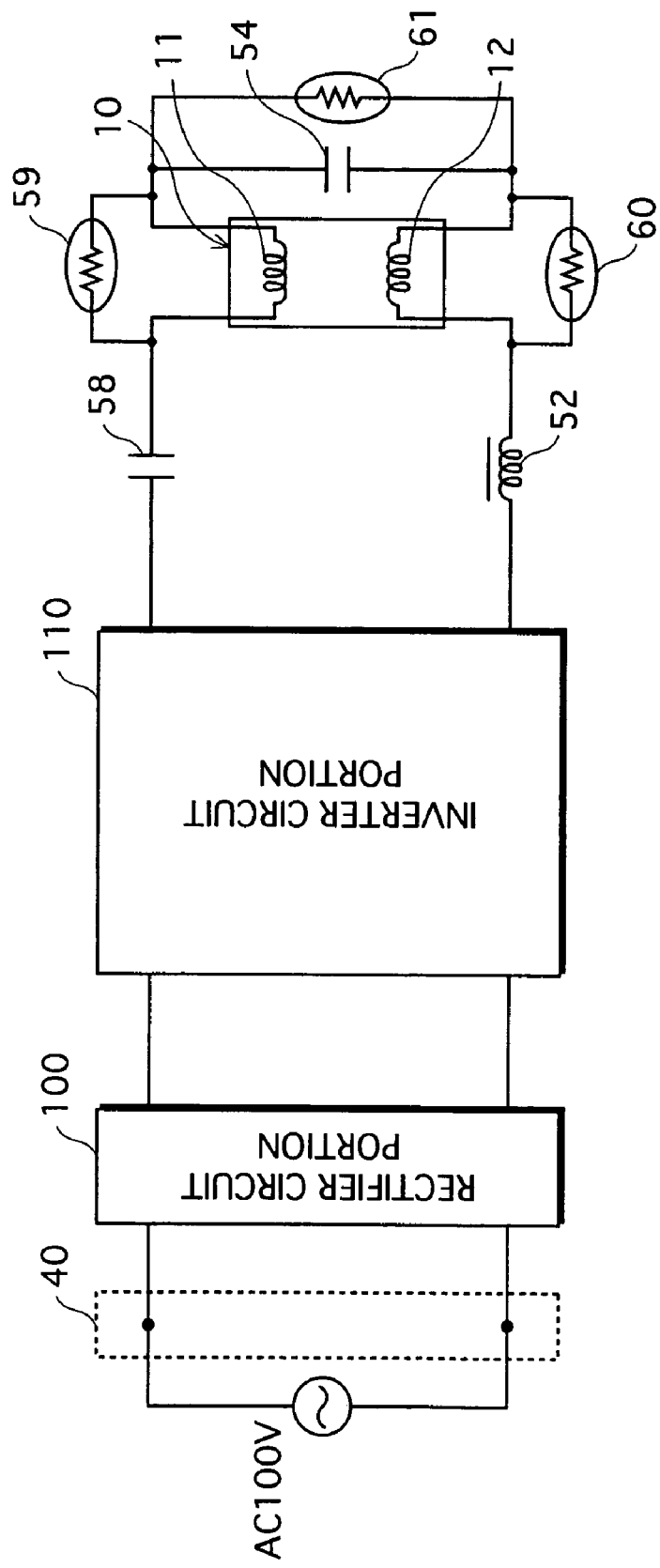
FIG. 3 is a circuit diagram of the compact self-ballasted fluorescent lamp 1.

Next, the structure of the lighting unit 50 is described with use of FIGS. 2A, 2B and 3. FIGS. 2A and 2B are diagrams showing the device positions for the lighting unit 50, respectively in perspective view and in plan view. FIG. 3 is a diagram showing the circuit structure of the lamp 1, including that of the lighting unit 50.

As shown in FIG. 2A, the print substrate 51 is a resin plate substantially in round shape. To the surface thereof that is provided to face the base 40 when assembled into the lamp 1 (hereinafter "front surface"), a plurality of insertion-mounting devices are mounted, the insertion-mounting devices including a choke coil 52, an electrolytic capacitor device 53, a resonance capacitor device 54, a pMOS-FET device 55 as a transistor device which is the switching device. The lead of each device inserted through the lead insertion hole is connected, by soldering, to a predetermined place of the electrically conductive lands that are provided in a given pattern on the rear surface of the print substrate 51 (see FIG. 2B).

Among the insertion-mounting devices, the choke coil 52 constitutes a series resonance circuit, in collaboration with the resonance capacitor device 54. Compared to the other electronic devices to be mounted to the lighting unit 50, the choke coil 52 takes up comparatively large amount of space, and so is provided at the substantial center of the print substrate 51 (by insertion mounting method). The structure of the choke coil 52 will be described later.

The electrolytic capacitor device 53 has specifications, for example, of 160V, and 12 µF, and is structured by a device main body 531 in substantially cylindrical form, and two lead portions 532 elongated from one end-face of the device main body 531. The device main body 531 is provided to position above the choke coil that is provided at the substantial center of the print substrate 51. According to this arrangement, the lead portions 532 are processed to be bent in crank-like form so as to conform to the outer surface of the choke coil 52, and each end of the lead portions 532 is inserted into a lead insertion hole provided for the print substrate 51. Then as described above, when the lighting unit 50 is stored in the resin case 30, the device main body of the electrolytic capacitor device 53 will position in the inner space of the resin case near where the base 40 is fixed, because this space has the smallest temperature in the lamp 1.

Note here that, although not detailed in FIG. 2A, each lead portion 532 of the electrolytic capacitor device 53 is covered with an insulating member (e.g. insulation tube), at the portion that conforms to the choke coil 52.

For the resonance capacitor device 54, a polyethylene capacitor device that has a capacity of 5600 pF is used, for example. The two lead portions of the resonance capacitor device 54 are processed to be bent so that the device main body will tilt towards the center of the main surface, to have an angle from the main surface. If the lighting unit 50 has such a structure that the lead portions of the resonance capacitor device 54 and the like are processed to be bent, thereby tilting the device main body, then the devices will hardly lie off the imaginary space formed by connecting the circumference of the print substrate 51 and the upper edge of the electrolytic capacitor device 53.

The pMOS-FET 55 functions as a switching device, and a freestanding type (insertion mounting type) is used therefor.

Next, as shown in FIG. 2B and as mentioned above, electrically conductive lands are formed on the rear surface of the print substrate 51, in a predetermined pattern. The lead portions of each device, after inserted from the front surface of the aforementioned print substrate 51, are attached to a predetermined portion of the electrically conductive lands at the rear surface.

In addition, as shown in FIG. 2B, at the substantial center of the rear surface of the print substrate 51, an nMOS-FET device 56 is surface-mounted. This nMOS-FET device 56 functionally forms a pair with the pMOS-FET device 55, and functions as a switching device. Here, the heat resistance temperature of the nMOS-FET device 56 is, for example, 150° C., at which or below the nMOS-FET device 56 can perform the switching function.

The device main body of the nMOS-FET device 56 is provided to be opposed to the choke coil 52 with the print substrate 51 therebetween. On the nMOS-FET device 56, lead portions 56a and 56b are formed. Among them, the lead portion 56b is placed at a position deviate from a position that faces the choke coil with the print substrate 51 therebetween.

By the aforementioned arrangement of the nMOS-FET device 56 and the choke coil 52, the lighting unit 50 is enabled to transmit the heat generated at the choke coil 52, swiftly and assuredly to the nMOS-FET device 56.

As for the lead portion 56a of the nMOS-FET device 56, it is not always required to position at place facing the choke coil 52 with the print substrate 51 therebetween.

In addition, as shown in FIG. 2B, a diode bridge device 57 is provided in the upper direction of the nMOS-FET device 56 in the drawing.

Note that many other electronic devices, than the nMOS-FET device 56 and the diode bridge device 57 that are described above, are surface-mounted on the rear surface of the print substrate 51, however the explanation thereof is omitted here.

As follows, the circuit structure of the lamp 1 including that of the lighting unit 50 is described, with use of FIG. 3.

As shown in FIG. 3, the lighting unit 50 is mainly structured by the rectifier circuit portion 100 and the inverter circuit portion 110.

The rectifier circuit portion 100 is structured by such as the diode bridge device 57 and the electrolytic capacitor device 53, that are illustrated in the aforementioned FIGS. 2A and 2B.

The inverter circuit portion 110 is mainly structured by the pMOS-FET device 55 and the nMOS-FET device 56, and additionally includes a ceramic capacitor device and a resistance device, and the like.

The inverter circuit portion 110 is connected to one of the leads of each of the electrode 11 and the electrode 12. Here, between the electrode 11 and the inverter circuit portion 110, a ceramic chip capacitor device 58 is inserted, and a secondary coil of the choke coil 52 is inserted between the electrode 12 and the inverter circuit portion 110.

To the electrodes 11 and 12, in the arc tube 10, NTC (negative temperature coefficient) devices 59 and 60 are connected, respectively.

In addition, between one of the leads of each of the electrodes 11 and 12 that is different from the lead to which the inverter circuit portion 110 is connected, a resonance capacitor device 54 and PTC (positive temperature coefficient) device 61, having been parallel-connected with each other, are inserted.

Among the aforementioned constituting elements, the choke coil 52 and the resonance capacitor device 54 constitute a serial resonance circuit.

(Lighting Starting Operation for Lamp 1)

Since the lighting operation for the lamp 1 having the above structure is already known, therefore detailed explanation thereof is not done. However the general structure is as follows.

The alternate power supplied from the commercial power source to the lamp 1 is temporarily converted to a direct power, which is then converted to a high-frequency power by the switching operation performed by the two FET devices 55 and 56 of the inverter circuit portion 110, then the high-frequency power is supplied to the arc tube 10. Specifically, the high-frequency power has 30 kHz–3.0 MHz (in particular, 30 kHz–100 kHz for lamps having electrode, and 300 kHz–3.0 MHz for electrodeless lamps). At the starting of the lamp 1, preheating starts for the electrodes 11 and 12, having been in low temperature, by the application of starting voltage. Then, after the electrodes 11 and 12 have been preheated for a predetermined time (about within 1 second), the voltage at both ends of the resonance capacitor device 54 rises. When the voltage at both ends has exceeded the starting voltage of the arc tube 10, the arc tube 10 causes insulation breakdown, thereby starting discharge.

Once being started, the discharge will be maintained in the arc tube 10 that has negative impedance, by restriction in power supplied from the lighting unit 50.

(Structure of Choke Coil 52)

Figure 4:
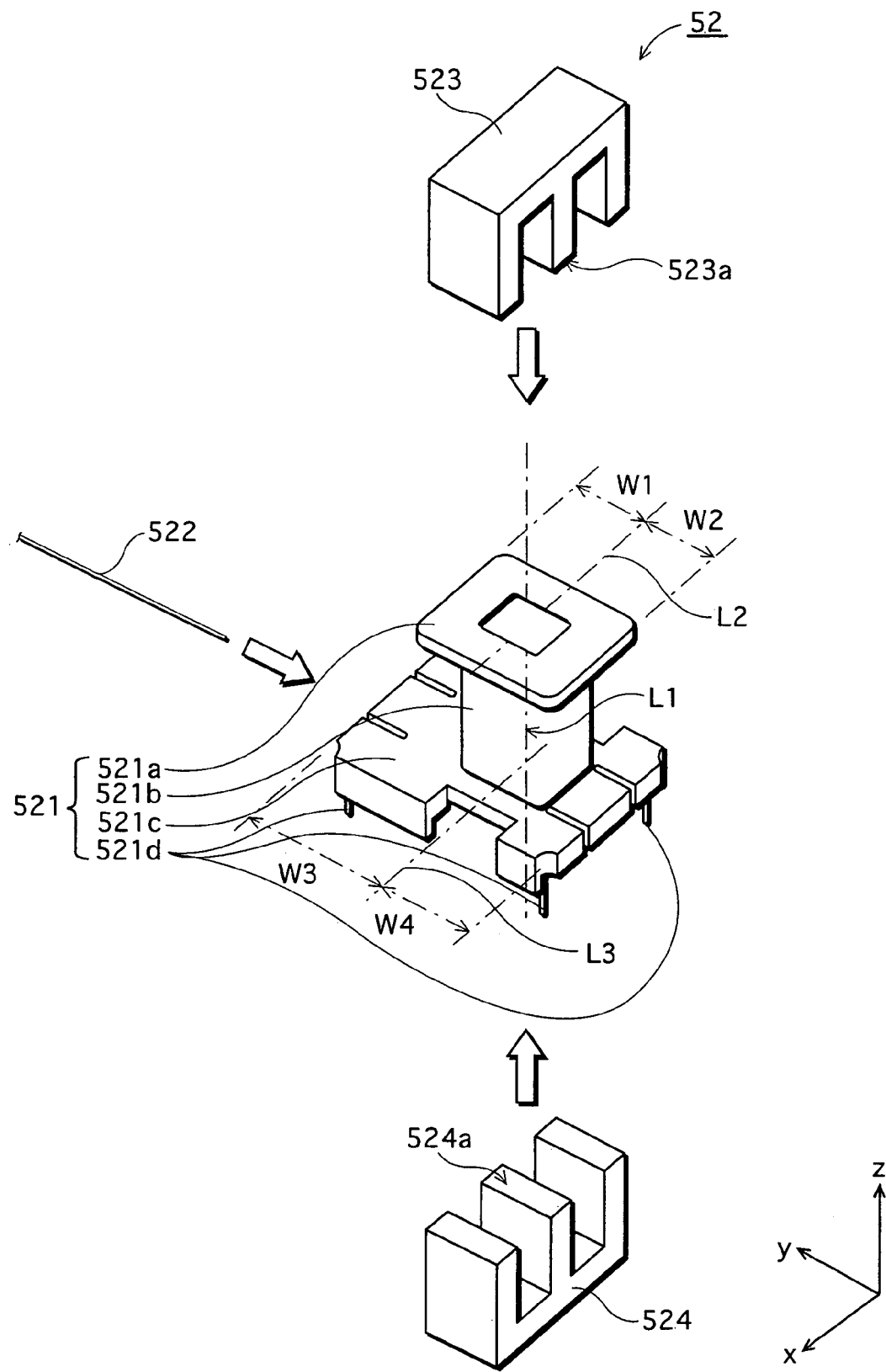
FIG. 4 is an exploded perspective view of the choke coil 52 provided for the lighting unit 50.

Next, among the electronic devices that the lighting unit 50 includes in FIG. 2, the choke coil 52 is described for the structure. FIG. 4 is an exploded perspective view of the choke coil 52 provided for the lamp 1 that relates to the embodiment of the present invention.

As shown in FIG. 4, the choke coil 52 is composed of a bobbin 521, a metal wire 522, and cores 523 and 524.

The bobbin 521 is a single piece into which an upper surface portion 521a, a body portion 521b, and a base portion 521c are integrated by means of a resin material. In addition, the bobbin 521 has a structure that four lead pins 521d protrude from the base portion 521c.

The center of the bobbin 52 is provided with a substantially rectangular-shaped hole, through which center protrusions 523a and 523b respectively for the cores 523 and 524 are inserted. This hole is provided along the direction z shown in FIG. 4. In such a bobbin 52, suppose drawing an imaginary line L1, at the center of the hole, in z direction; an imaginary line L2 that elongates in the direction x from an intersection point between the imaginary line L1 and an upper surface of the upper surface portion 521a; and an imaginary line L3 that elongates in the direction x from an intersection point between the imaginary line L1 and the base portion 521c. On this premise, if distances from the imaginary line L2 to the both edges of the upper surface portion 521a in the direction y are respectively set as W1 and W2, these W1 and W2 are set to have substantially same value.

On the contrary, suppose setting, as W3 and W4 respectively, the distances from the imaginary line L3 to the both edges of the base portion 521c in the direction y. Then, the W3 is set to be longer than the W4. Which is to say, in the bobbin 52, the center of the base portion 521c in the direction y is disposed to be offset with respect to the center of the upper surface portion 521a in the direction y (and also with respect to the center of the body portion 521b in the direction y). For example, W1 and W2 are set as 5.5 mm, W3 as 8.0 mm, and W4 as 6.5 mm.

As seen above, in the bobbin 52, the base portion 521c is formed to offset with respect to the upper surface portion 521a and to the body portion 521b. Thus formed bobbin 52 can help improve space efficiency, in mounting of the electronic devices on the print substrate 51, shown in FIG. 2A. Specifically, in mounting electronic devices around the choke coil 52 having been mounted to the print substrate 51, if the leads of the electronic devices are processed to be bent with respect to the choke coil 52, the device main bodies of the electronic devices can be placed above the W3 side of the base portion 521c. This helps reduce the effective volume of the lighting unit 50, if only a little.

(Positional Relation Among Choke Coil 52, nMOS-FET Device 56, and Electrolytic Capacitor Device 53)

Figure 5:
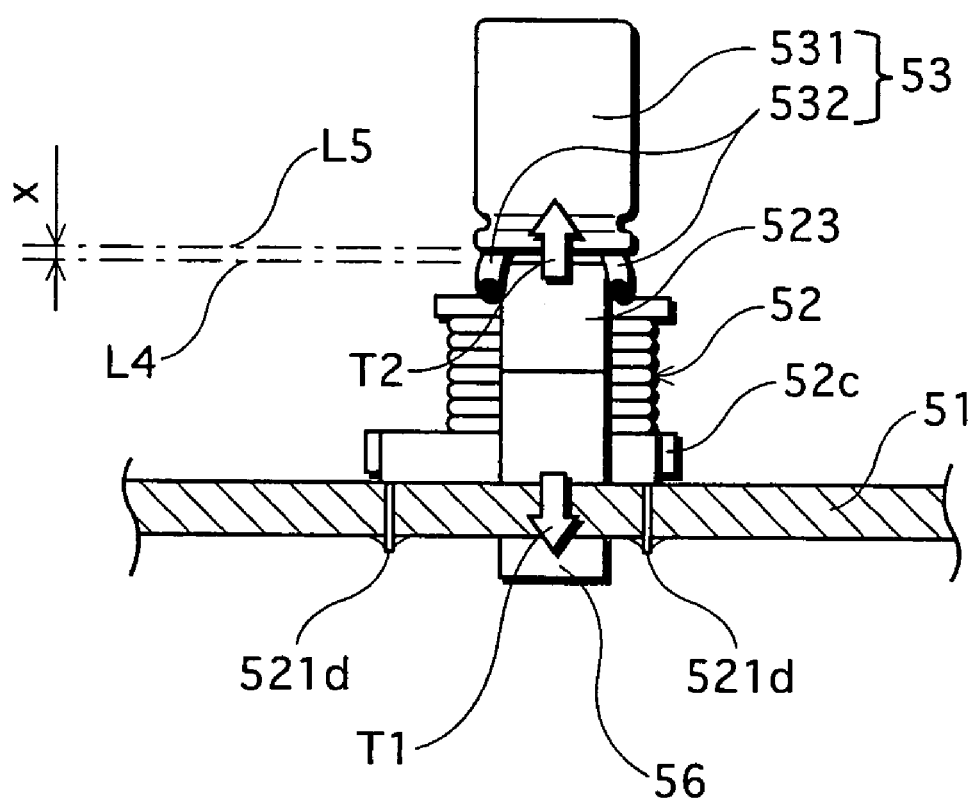
FIG. 5 is a sectional view showing the positional relations among the choke coil 52, the electrolytic capacitor device 53, and the nMOS-FET device 56, in the lighting unit 50.

With regard to the lighting unit 50 that has the above-described structure, the positional relation among the choke coil 52, the nMOS-FET device 56, and the electrolytic capacitor device 53, when they are disposed on the print substrate 51, is described using FIG. 5. FIG. 5 is a sectional view of a portion of the lighting unit 50.

As shown in FIG. 5, in the above-described lighting unit 50, the choke coil 52 and the nMOS-FET device 56 are disposed to face each other, with the print substrate 51 therebetween. Which is to say, the nMOS-FET device 56 is provided so that the device main body thereof positions inside an area surrounded by the four lead portions 521d of the choke coil 2, the lead portions 521d protruding from the rear surface of the print substrate 51 via the lead insertion hole of the print substrate 51.

In addition, above the choke coil 52 (in the base 40 direction in storing of the lamp 1), the device main body 531 of the electrolytic capacitor device 53 is disposed with a gap x therebetween (e.g. 4 mm or smaller gap). Here, the gap x is equal to a distance between 1) an imaginary line L4 drawn from the upper surface of the core 523 of the choke coil 52 to be parallel to the surface of the print substrate 51 and 2) an imaginary line L5 drawn from the lowermost portion of the device main body 531 of the electrolytic capacitor device 53. Here, the lead portions of the electrolytic capacitor device 52 are inserted between the device main body 531 and the choke coil 52, and into a hole of the print substrate 51.

Note that the main body 531 of the electrolytic capacitor device 53 and the choke coil 52 may be disposed with a gap x of 0 mm, in other words, may be disposed to be in contact with each other.

(Advantage of Lamp 1 Equipped With Lighting Unit 50)

Next, the advantage of the lamp 1 equipped with the lighting unit 50 is explained, continuously using FIG. 5.

When the lamp causes non-emission state, either the nMOS-FET device 56 or the electrolytic capacitor device 53 is broken, due to heat generated at the choke coil 52 in addition to increase in electric current running in the circuit as mentioned above, thereby stopping the glow discharge at the electrodes 11 and 12 of the arc tube 10.

Specifically, a portion(T1) of the heat generated at the choke coil 52 in a non-emission state will be transmitted to the device main body of the nMOS-FET device 56 surface-mounted to the backside of the choke coil 52 via the print substrate 51 therebetween. Then, the nMOS-FET device 56 will break when the temperature of the device main body has exceeded the heat resistance temperature of the device (e.g. 150° C.). This will stop the switching function, and so the glow discharge at the electrodes 11 and 12 of the arc tube 10 will stop.

In addition, another portion of the heat (T2) generated at the choke coil 52 in the non-emission state will be transmitted to the device main body 531 of the electrolytic capacitor device 53, via the gap x and the lead portions 532. In such a case too, the electrolytic capacitor device 53 will break when the temperature of the device main body 531 of the electrolytic capacitor device 53 has exceeded the heat resistance temperature 110° C. By breakage of the electrolytic capacitor device 53, the lighting operation of the lighting unit 50 will stop, thereby stopping the glow discharge at the electrodes 11 and 12 of the arc tube 10. Even if the breakage of the electrolytic capacitor device 53 has not led to the stop of the operation of the circuit, this breakage surely disables a function of smoothing the power, and so the pMOS-FET device 55 and the nMOS-FET device 56 will cause an increased switching loss. If causing a large switching loss, the FET devices 55 and 56 will break due to heat, resulting in stopping of the lighting operation of the lighting unit 50, just as described above. Therefore in this case too, the glow discharge at the electrodes 11 and 12 of the arc tube 10 will be stopped swiftly and assuredly.

Note that the electrolytic capacitor device 53 is normally formed as described in FIG. 5. Therefore, the lead portions 532 will position between the device main body 531 and the choke coil 52. This is why the gap x is formed between the choke coil 52 and the electrolytic capacitor device 53. If this gap x is set to be 4 mm or smaller, the heat generated at the choke coil 52 is favorably transmitted to the device main body 531. Furthermore, in the lamp 1, the lead portions of the electrolytic capacitor device 53 are provided along the outer surface of the choke coil 52, which helps even more enhance the heat transmission.

(Mounting Orientation of Devices for Lighting Unit 50)

Figure 6:
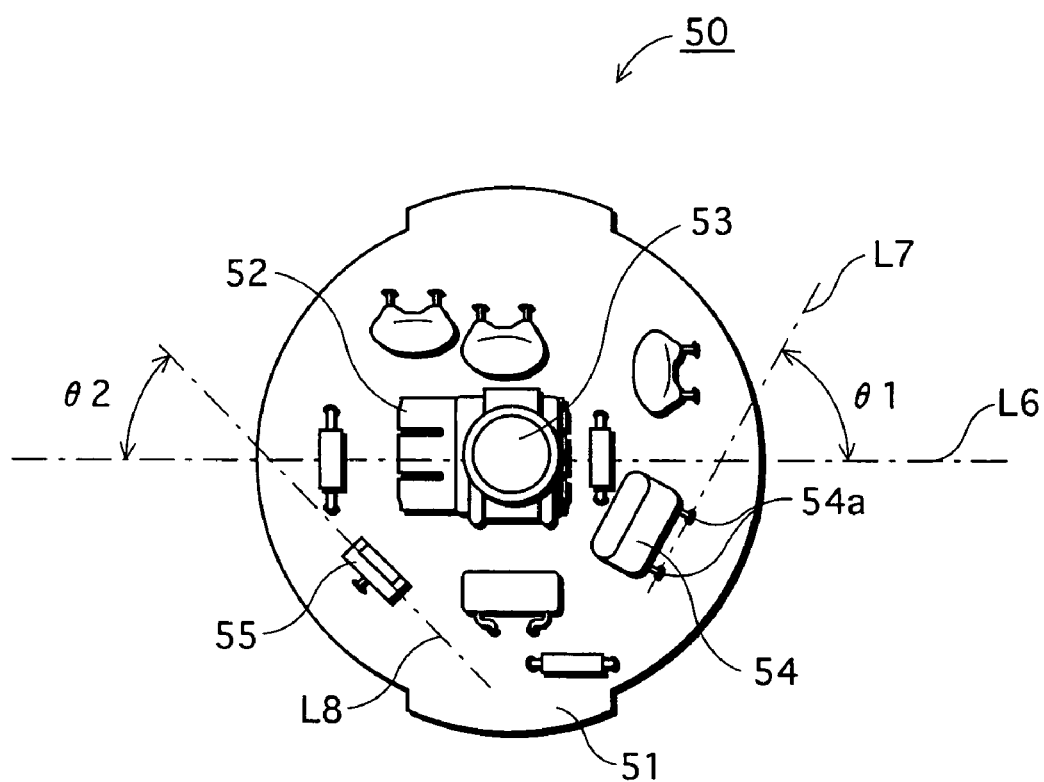
FIG. 6 is a plan view of the lighting unit 50 seen from the front surface side of the print substrate 51.

Next, the mounting orientation of devices for the lighting unit 50, in particular the mounting orientation of the insertion mounting devices to be mounted to the front surface of the print substrate 51, are described with use of FIG. 6. FIG. 6 is a plan view of the lighting unit 50 of FIG. 2A, viewed from above the electrolytic capacitor device 53 and in slanting direction.

As FIG. 6 shows, the round print substrate 51 is provided with the choke coil 52 and the electrolytic capacitor deice 53, in the substantial center. Here, the mounting orientation of the choke coil 52 is the orientation shown by the imaginary line L6, which is parallel to the lengthwise orientation of the base portion 521c in the bobbin 521 (see FIG. 4). This orientation coincides with the orientation in which the print substrate 51 is transferred in production of the lighting unit 50.

As FIG. 6 shows, among the insertion mounting devices of the lighting unit 50, the resonance capacitor device 54 and the pMOS-FET device 55 have mounting orientations of θ1 and θ2, respectively. More specifically, suppose setting a line passing two points at which the two lead portions 54a are inserted in the lead insertion holes of the print substrate 51, as an imaginary line L7, and setting a line passing the two lead portions that are outside the pMOS-FET device 55, as an imaginary line L8. Then, the imaginary line L6 and the imaginary line L7 form an angle of θ1, and the imaginary line L6 and the imaginary line L8 form an angle of θ2. Which is to say, the imaginary line L7 is parallel to the mounting orientation of the resonance capacitor device 54, and likewise, the imaginary line L8 is parallel to the mounting orientation of the pMOS-FET device 55.

Both of the angles θ1 and θ2 are set to be in a range larger than 0 degree, and smaller than 90 degrees.

As described above, the lighting unit 50 is set such that at least one of the insertion mounting devices is provided so as to have an angle in a range larger than 0 degree and smaller than 90 degrees, with respect to the mounting orientation of the choke coil 52. Therefore, each lead portion can be processed to be bent so as to tilt the device main body towards the center of the surface of the print substrate 51, thereby improving the disposition efficiency for the devices in the lighting unit 50, and reducing the effective volume of the devices.

Accordingly, the lamp 1 equipped with the lighting unit 50 is able to have a smaller resin case 30, and so can be an alternate for an incandescent lamp having a base of E17-type (e.g. mini krypton bulb).

(Other Matters)

It should be noted that in the above-described embodiment and its modifications, a compact self-ballasted fluorescent lamp that has a spiral tube as the arc tube is taken as one example. However, the present invention should not be limited to such. For example, the present invention is also applicable to a fluorescent-lamp driving apparatus for driving the arc tube having a U-shaped discharge path, and to a compact self-ballasted fluorescent lamp equipped with an arc tube having a U-shaped discharge path, so as to obtain the same effect as those of the aforementioned embodiment.

Furthermore, in the embodiment, a compact self-ballasted fluorescent lamp of 12W-type is taken as one example. However, the sizes and soon are not limited to as described. In addition, electronic devices provided for the fluorescent-lamp driving apparatus (i.e. the lighting unit 50 in the embodiment) are not limited to as described above, as far as rating, type, position, and the like.

In the embodiment, the nMOS-FET device 55 to be provided at the rear side of the print substrate 51 is a surface-mounting device. However, an insertion-mounting device may be used therefor, and the same effect will still be obtained as the embodiment. The other devices may be insertion-mounting devices, too.

In addition, in the compact self-ballasted fluorescent lamp described above as an example of the embodiment, the choke coil 52 and the device main body 531 of the smoothing electrolytic capacitor device 53 are disposed in the proximity of each other, with the gap x therebetween in the lighting unit 50. However, the choke coil 52 and the device main body 531 of the electrolytic capacitor device 53 may be disposed to be in direct contact with each other. If doing so, the heat generated at the choke coil 52 in the non-emission state will be directly transmitted to the device main body 531 of the electrolytic capacitor device 53, and so it is preferable in that the glow discharge at the electrodes 11 and 12 of the arc tube 10 is more assuredly stopped.

Although the present invention has been fully described by way of examples with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving apparatus for driving a fluorescent lamp using a high-frequency inverter method, the driving apparatus comprising:
    a substrate that has a first main surface and a second main surface, each main surface including an electronic-device mountable area;
    a choke coil that is mounted to the first main surface and is terminally connected to the substrate, the choke coil being a component of a high-frequency inverter; and
    a switching device comprising a main body including a switching function, and a lead portion elongated from the main body, wherein the entire main body of the switching device is oriented on the second main surface directly opposite the choke coil with the substrate therebetween and to be thermally coupled to the substrate, the switching device being a component of the high frequency inverter and being positioned in a power-supply path to the fluorescent lamp.

2. The driving apparatus of claim 1, wherein the switching device shuts down or restricts a power supply to the fluorescent lamp when a temperature of the main body of the switching device exceeds a heat resistance temperature, the main body receiving transmission of heat generated at the choke coil.

3. The driving apparatus of claim 1, further comprising:
    rectifier circuit portion that includes a smoothing capacitor device, wherein
    the smoothing device i) includes: a main body in substantially cylindrical shape; and a lead portion elongated from the smoothing capacitor device main body, and ii) is provided for the first main surface of the substrate, and the smoothing capacitor device main body is provided either a) in proximity of the choke coil with a gap of 4 mm or smaller therebetween, or b) in contact with the choke coil.

4. The driving apparatus of claim 3, wherein
the smoothing capacitor device lead portion is processed to be bent to conform to the outer surface of the choke coil, and
the heat generated at the choke coil is transmitted to the smoothing capacitor device main body via the smoothing capacitor device lead portion.

5. The driving apparatus of claim 1, wherein a plurality of electronic devices, different from the choke coil, are mounted to the first main surface of the substrate by insertion mounting method,
at least one of the electronic devices is provided to have an angle in a range larger than 0 degree and smaller than 90 degrees, with respect to a mounting orientation of the choked coil, and
a lead portion of the electronic device having the angle is processed to be bent towards a center of the first main surface.

6. The driving apparatus of claim 1, wherein
the fluorescent lamp includes an arc tube that has a double-spiral discharge path.

7. A compact self-ballasted fluorescent lamp comprising:
an arc tube that has a doubled-spiral discharge path, and electrodes provided at both ends of the discharge path; and
a lighting-apparatus unit that supplies power to the electrodes of the arc tube, and drives the arc tube using a high-frequency inverter method, the lighting-apparatus unity including: a substrate that has a first main surface and a second main surface, each main surface including an electronic-device mountable area; a choke coil that is mounted to the first main surface and is thermally connected to the substrate, the choke coil being a component of a high-frequency inverter; and a switching device comprising a main body including a switching function, and a lead portion elongated from the main body, wherein the entire main body of the switching device is oriented on the second main surface directly opposite the choke coil with the substrate therebetween and to be thermally coupled to the substrate, the switching device being a component of the high-frequency inverter and being positioned in a power-supply path to the fluorescent lamp.

8. The compact self-ballasted fluorescent lamp of claim 7, wherein
the switching device shuts down or restricts the power supply when a temperature of the main body of the switching device exceeds a heat resistance temperature, the main body receiving transmission of heat generated at the choke coil.

9. The compact self-ballasted fluorescent lamp of claim 7, wherein
the lighting-apparatus unit includes a rectifier circuit portion that includes a smoothing capacitor device,
the smoothing capacitor device i) includes: a main body in substantially cylindrical shape; and a lead portion elongated from the smoothing capacitor device main body, and ii) is provided for the first main surface of the substrate, and
the smoothing capacitor device main body is provided either a) in a proximity of the choke coil with a gap of 4 mm or smaller therebetween, or b) in contact with the choke coil.

10. The compact self-ballasted fluorescent lamp of claim 9, wherein
the smoothing capacitor device lead portion is processed to be bent to conform to the outer surface of the choke coil, and
the heat generated at the choke coil is transmitted to the smoothing capacitor device main body via the smoothing capacitor device lead portion.

11. The compact self-ballasted fluorescent lamp of claim 7, wherein
a plurality of electronic devices, different from the choke coil, are mounted to the first main surface of the substrate by insertion mounting method,
at least one of the electronic devices is provided to have an angle in a range larger than 0 degree and smaller than 90 degrees, with respect to a mounting orientation of the choke coil, and
a lead portion of the electronic device having the angle is processed to be bent towards a center of the first main surface.

12. The compact self-ballasted fluorescent lamp of claim 7, wherein the both ends of the arc tube are stored in a case together with the lighting-apparatus unit.

13. The driving apparatus of claim 1, wherein the choke coil is oriented in substantially a center of the first main surface, and the switching device is oriented in substantially a center of the second main surface.

* * * * *